(12) United States Patent
Lewis

(10) Patent No.: US 6,263,160 B1
(45) Date of Patent: Jul. 17, 2001

(54) STABILIZED PLATFORM SYSTEMS FOR PAYLOADS

(75) Inventor: Michael D. Lewis, Burlington (CA)

(73) Assignee: Wescam Inc., Flamborough (CA)

( * ) Notice: Subject to any disclaimer, the term of this patent is extended or adjusted under 35 U.S.C. 154(b) by 0 days.

(21) Appl. No.: 09/330,043

(22) Filed: Jun. 11, 1999

(51) Int. Cl.[7] .............................. G03B 39/00; G03B 17/00
(52) U.S. Cl. ......................... 396/13; 396/419; 396/428; 248/550
(58) Field of Search ................................ 396/7, 12, 13, 396/419, 428; 348/144–147; 248/550, 638

(56) References Cited

U.S. PATENT DOCUMENTS

| | | | |
|---|---|---|---|
| 4,197,548 | * | 4/1980 | Smith et al. .......................... 343/765 |
| 4,919,382 | * | 4/1990 | Forman ................................ 248/178 |
| 5,638,303 | * | 6/1997 | Edberg et al. ....................... 364/559 |

* cited by examiner

Primary Examiner—David M. Gray
(74) Attorney, Agent, or Firm—Robert F. Delbridge

(57) ABSTRACT

A stabilized platform system for isolating a payload from angular motions of a supporting structure has a base assembly securable to a supporting structure, and a payload stabilizing assembly carried by the base assembly and mounted for angular movement relative thereto about two or more separate axes. At least one of the axes is non-orthogonal with respect to another of the axes and mounted for limited angular movement relative to the base assembly, and the axes have extensions which meet at a common point.

7 Claims, 8 Drawing Sheets

STABILIZED PLATFORM SYSTEMS FOR PAYLOADS

FIELD OF THE INVENTION

This invention relates to stabilized platform systems for isolating a payload from angular motions of a supporting structure.

BACKGROUND OF THE INVENTION

As imaging devices such as motion picture and video cameras are more frequently being mounted on unstable structures to achieve a desired point of view, image stabilizing devices are becoming more necessary. With the long focal length video lenses in use today, even a tripod on a concrete stadium floor can impart enough undesirable motion to spoil the shot. Scaffolds, cranes and moving vehicles all impart significant levels of motion which can limit the use of long focal length imaging devices. This problem can be overcome by using a stabilized platform system such as described in U.S. Pat. No. 3,638,502 (Leavitt et al) issued Feb. 1, 1972 and U.S. Pat. No. 4,989,466 (Goodman) issued Feb. 5, 1991. However, the platform systems described in these patents have many disadvantages, for example complexity, size and weight.

U.S. Pat. No. 5,897,223 (Tritchew et al) issued Apr. 27, 1999 (the contents of which are hereby incorporated herein by reference) describes an improved stabilized platform system for isolating a payload from angular motion and translational vibration of a supporting structure. The platform system has an inner gimbal for carrying the payload, a sprung shell containing and carrying the inner gimbal in a manner permitting the inner gimbal a limited amount of angular movement relative thereto amount pitch, roll and yaw axes, an outer gimbal containing the sprung shell and inner gimbal, and a passive vibration isolator connected between the sprung shell and the outer gimbal and having two symmetrical arrays of dampened coil springs located on opposite sides of the sprung shell. The angular position measured between the inner and outer gimbals is used as an error signal to drive the outer gimbal to follow the inner gimbal, thereby allowing large ranges of steering motion.

While the platform system described by Tritchew et al has many advantages and improvements over the previously mentioned systems of Leavitt et al and Goodman, the universal joint and supporting structure still occupies the central area of the inner gimbal. For use with single sensors such as large video and film cameras, the Tritchew et al platform system would require the use of large counterweights to balance the sensor about the central pivot. The size and weight of such a platform system, relative to such a sensor, would therefore be significant.

Conventional gimballing methods for freeing up the central area require the use of large gimbal rings around the payload connected together through bearing axes orthogonally. Such large rings can limit system performance due to structural resonances and inertial effects. Such gimbal rings also add weight and restrict payload volume.

Another problem with such prior art platform systems is that it is difficult to adapt them to standard film or video camera packages currently used by the motion picture and broadcast industry. Instead, specific custom camera packages are normally engineered to operate with known Gimbal systems. While a certain degree of interchangeability can be designed into these systems, the camera packages still have custom designed features or characteristics.

Many non-stabilized camera steering heads have been developed to utilize standard camera packages. Such steering heads tend to have large open structures which are prone to low frequency structural resonances which contribute to undesirable motion of the camera. Some attempts have been made to stabilize such steering heads. However, torquing through these large open structures severely limits the attainable system bandwidth.

It is therefore an object of the present invention to provide a stabilized platform system which at least substantially overcomes the problems described above.

SUMMARY OF THE INVENTION

According to the present invention, a stabilized platform system for isolating a payload from angular motions of a supporting structure has a base assembly securable to the supporting structure, and a payload stabilizing assembly carried by the base assembly and mounted for angular movement relative thereto about two or more separate axes. At least one of the axes is non-orthogonal with respect to another of the axes and is mounted for limited angular movement relative to the base assembly. The axes have extensions which meet at a common point, which is preferably within the periphery of the payload.

The payload stabilizing assembly may include a first angular adjustment arm with one end pivotally mounted on the base assembly for limited angular movement relative thereto about a first of said three axes, a second angular adjustment arm having one end pivotally mounted on another end of the first angular adjustment arm for limited angular movement relative thereto about a second of said three axes, and a payload carrier pivotally mounted on another arm of the second angular adjustment arm for limited angular movement relative thereto about the third of said three axes.

The platform system may also include an array of at least three magnetic torque motors, each motor having an electrically energizable coil portion carried by the base assembly and a magnetic structure portion carried by the payload stabilizing assembly, each magnetic torque motor having an active axis along which a payload stabilizing assembly positioning force can be applied but having freedom of movement about the other two axes, and a controller for controlling energization of the motors to apply controlled moments to the payload stabilizing assembly about any axis of rotation.

The stabilized platform system may have at least one capacitive angle sensor having a first portion carried by the base assembly and the second portion carried by the payload stabilizing assembly with an air gap between said first and second portions, said capacitive angle sensor being responsive to relative movement between the first and second portions to provide a signal indicative of the angular position of the payload stabilizing assembly relative to the base assembly.

The payload stabilizing assembly may carry at least one angular rate sensor operable to provide the signal of angular movement of the payload stabilizing assembly about a pre-determined axis.

The angular rate sensor may be a fibre optic gyro.

BRIEF DESCRIPTION OF THE DRAWINGS

One embodiment of the present invention will now be described, by way of example, with reference to the accompanying drawings, of which.

DESCRIPTION OF PREFERRED EMBODIMENT

Figure 1:
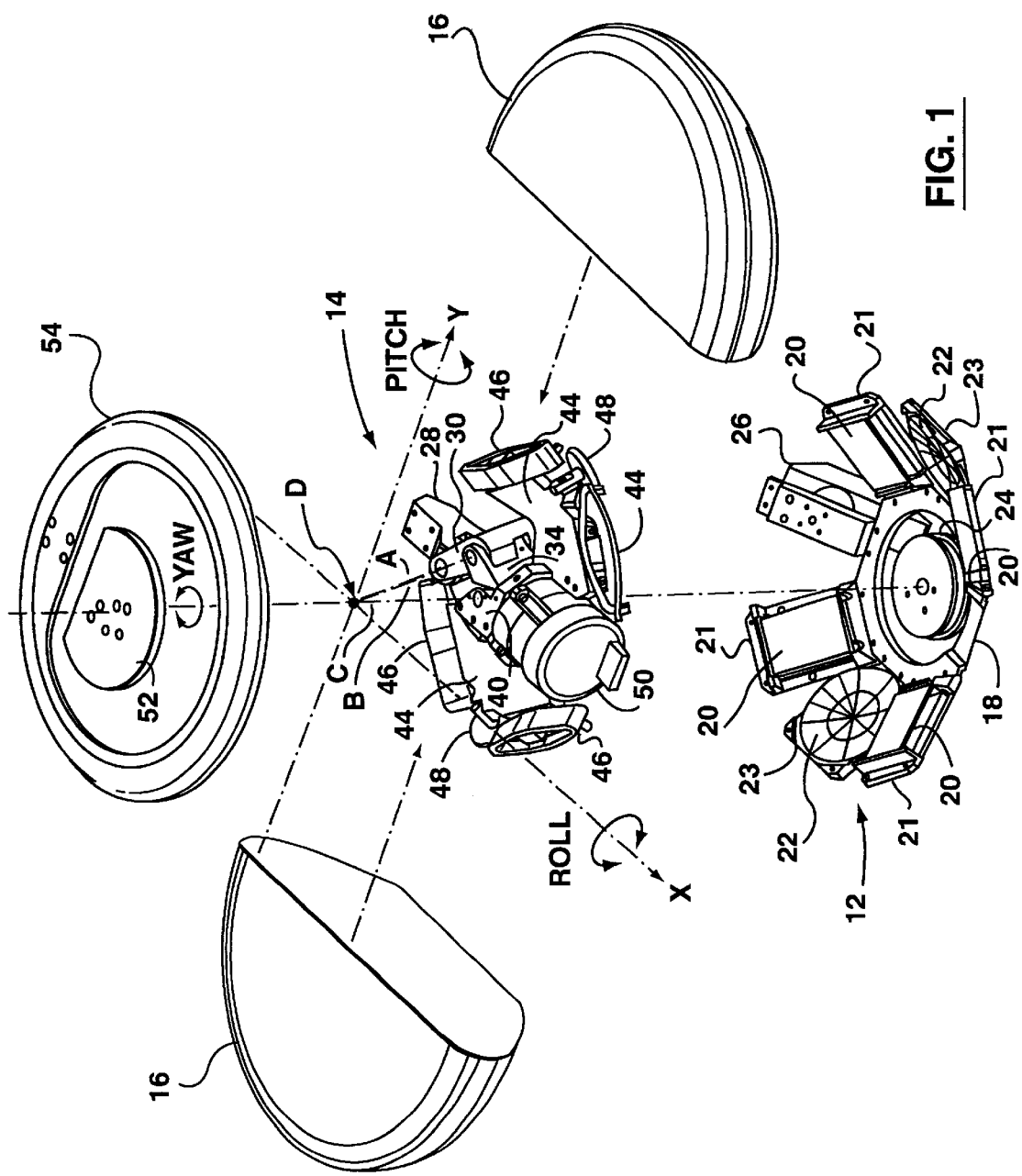
FIG. 1 is an exploded perspective view of the stabilized platform system.

Referring to the drawings, FIG. 1 shows a stabilized platform system with an outer gimbal in the form of a base assembly 12 securable to a supporting structure (not shown) such as a camera boom, an inner gimbal in the form of a payload stabilizing assembly 14 and a two-part casing 16.

The base assembly 12 has an octagonal base member 18 which is securable by bolts (not shown) to the supporting structure. The base member 18 carries the electrically energizable coil portions 20 of four torque motors substantially equally spaced around its periphery and extending in upwardly and outwardly inclined directions. Torque motors of this kind are described in more detail in previously mentioned U.S. Pat. No. 5,897,223. The base member 18 also carries diametrically opposite capacitive sensor arrays 22 of a pair of capacitive angle sensors located between adjacent pairs of motor coil portions 20 and also extending from the periphery of the base member 18 in upwardly and outwardly inclined directions. Capacitive angle sensors of this kind are also described in U.S. Pat. No. 5,897,223.

The centre of the base member 18 has a circular stop portion 24 which limits motion of the payload stabilizing assembly 14, as will be described in more detail later. The base member 18 further carries a mounting arm 26 for payload stabilizing assembly 14 which extends upwardly and outwardly from the periphery of the base member 18 and is located between adjacent pairs of motor coil portions 20 so that a pair of motor coil portions 20 with a capacitive sensor array 22 therebetween is located on each side of the mounting arm 26.

Figure 2:
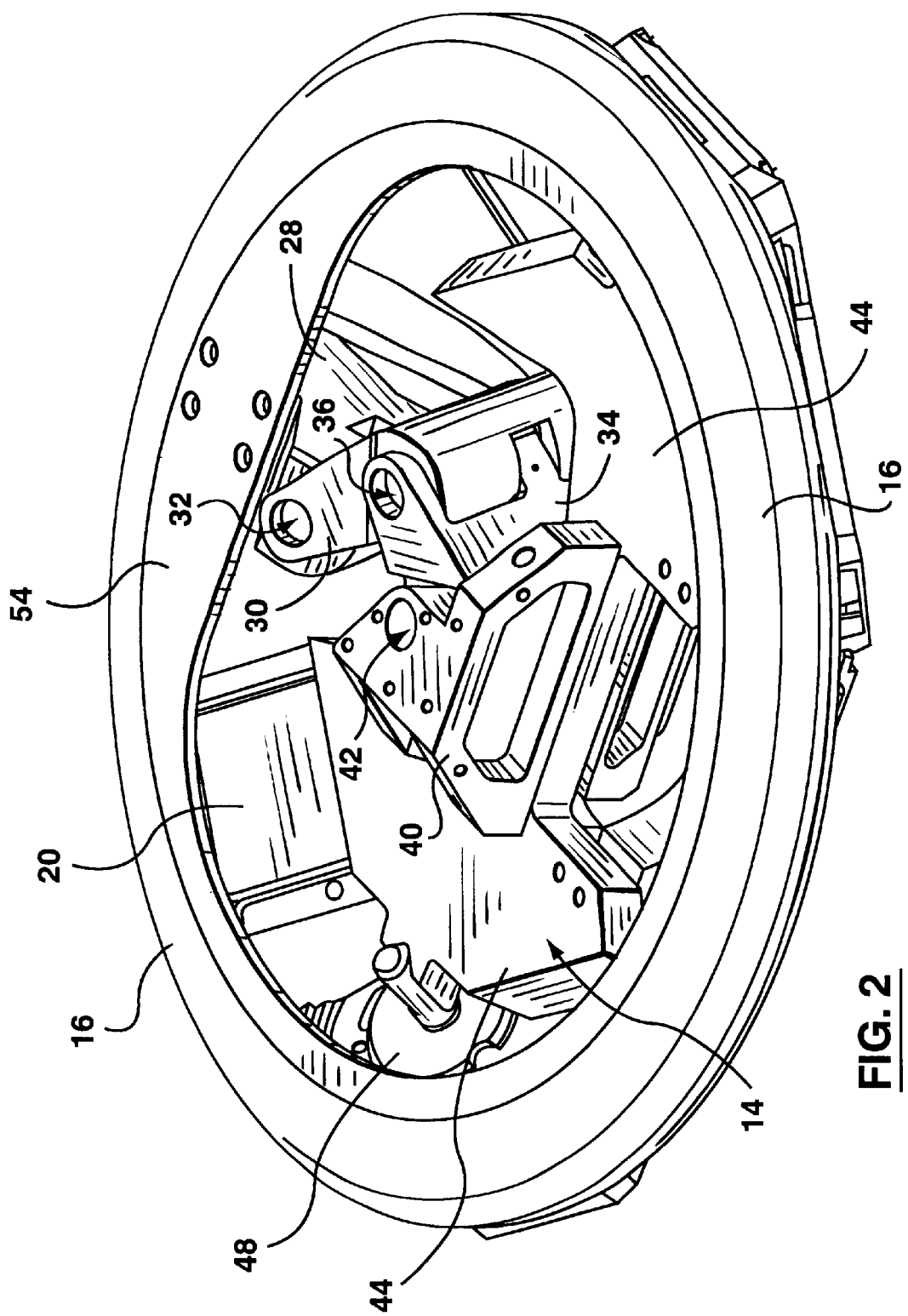
FIG. 2 is a perspective view of a stabilized platform system in accordance with one embodiment of the invention with some parts being omitted so as to show other parts more clearly.
Figure 3:
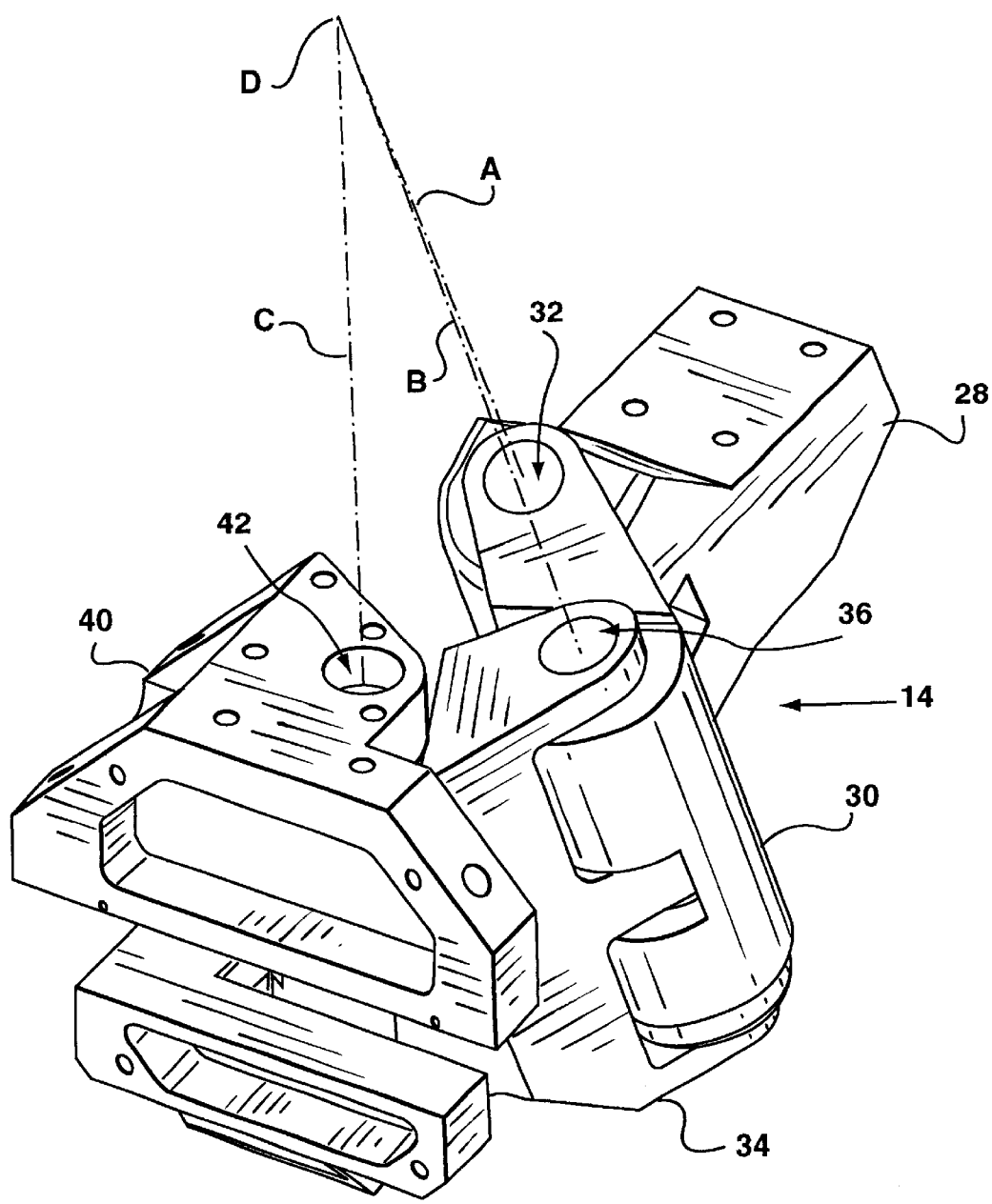
FIG. 3 is a perspective view of the universal joint arrangement used in the platform system shown in FIGS. 1 and 2.

Referring also now to FIGS. 2 and 3, the payload stabilizing assembly 14 has a mounting arm 28 securable by bolts (not shown) to the mounting arm 26 of the base assembly 12. A first angular adjustment arm 30 has one end pivotally mounted by means of a bearing 32 on the mounting arm 28 so that the adjustment arm 30 is capable of a limited amount of angular movement relative to the mounting arm 28 about an axis A which is upwardly and inwardly inclined in a manner which will be described in more detail later. A second angular adjustment arm 34 has one end pivotally mounted by means of a bearing 36 on the other end of the first adjustment arm 30 so that the adjustment arm 34 is capable of a limited amount of angular movement relative to the first adjustment arm 30 about an axis B of which is also upwardly and inwardly inclined in a manner which will be described in more detail later.

A payload carrier 40 is pivotally mounted by means of a bearing 42 on the other end of the second adjustment arm 34 so that the payload carrier 40 is capable of a limited amount of angular movement relative to the second adjustment arm 34 about a vertical axis C. When extended, axes A, B and C meet at a point D which is some distance above the payload stabilizing assembly and which, when a payload is mounted thereon, is within the periphery of the payload (not shown). As shown in FIG. 1, the orthogonal role, pitch and yaw axes x, y and z of the stabilizing assembly 14 meet at and pass through the point D at which extensions of axes A, B and C meet.

Referring again to FIGS. 1 and 2, a mounting plate 44 is secured in any suitable manner to the bottom of the payload carrier 40 and carries the motor and sensor components which complement the components provided on the base assembly 12. Thus, the mounting plate 44 carries the magnetic structure portions 46 of the four torque motors substantially equally spaced around its periphery and angled to cooperate with the electrically energizable coil portions 20 mounted on the base assembly 12. Likewise, the mounting plate 44 also carries the capacitive excitation plates 48 of the two capacitive angle sensors located between adjacent pairs of magnetic structure portions 46 and angled to cooperate with the capacitive sensor arrays 22 on the base assembly 48. The payload carrier 40 also carries an angular rate sensor, such as a fibre optic gyro (FOG) 50, which is used in the same manner as described in U.S. Pat. No. 5,897,223.

The stabilizing assembly 14 also includes a payload interface plate 52 which is secured by bolts (not shown) to the top of the payload carrier 40. An annular structural member 54 is secured by bolts (not shown) to the top of the mounting arm 28 of the stabilizing assembly 14 and also to the upper ends of mounting plates 21, 23 on the base member 18 and on which motor coil portions 20 and the capacitive sensor arrays 22 are mounted, as well as to the upper end of mounting arm 26.

Figure 4:
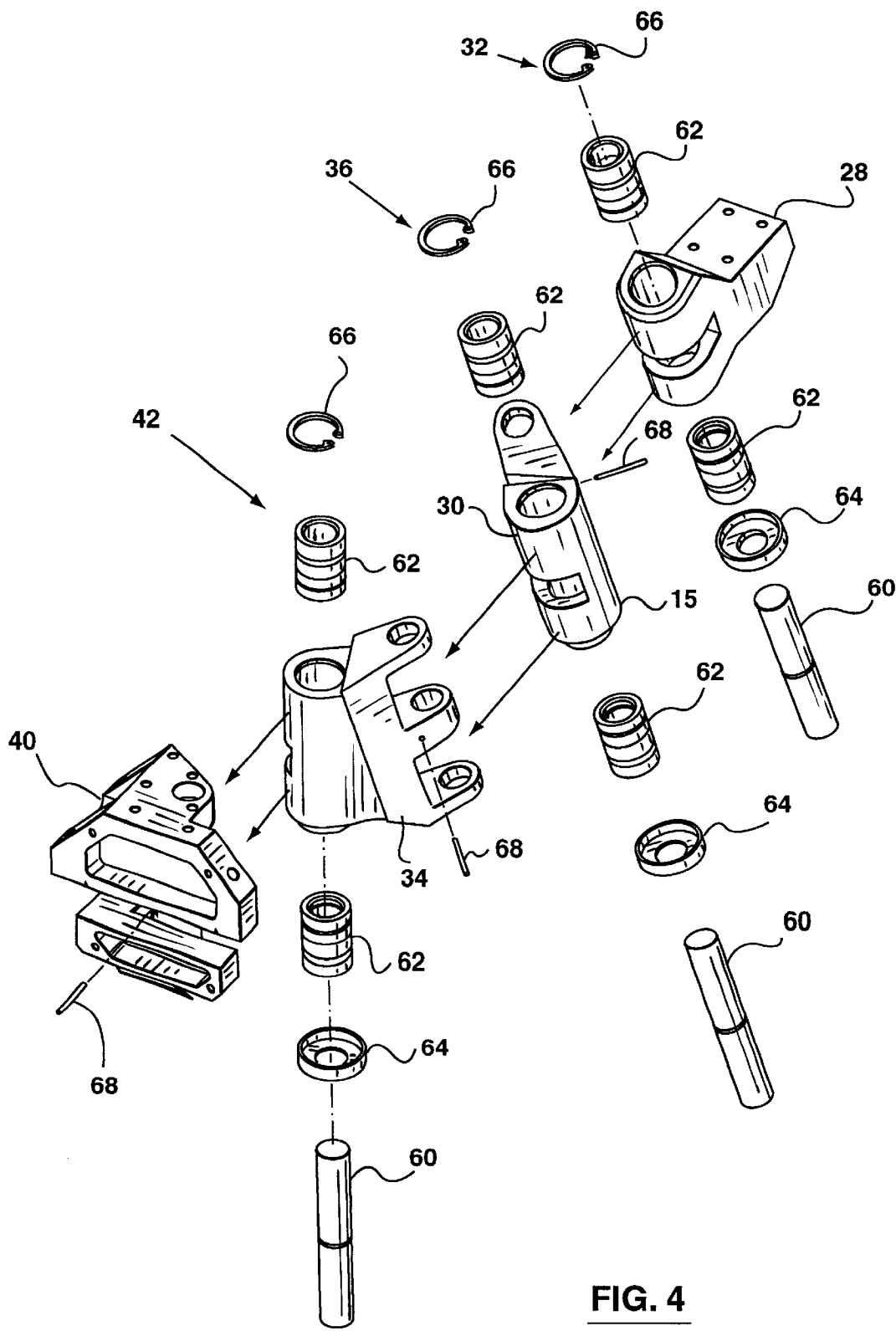
FIG. 4 is an exploded perspective view of the universal joint arrangement shown in FIG. 3.

FIG. 4 shows a construction of the adjustment arm bearings 32, 36, 42. Each bearing has a bearing shaft 60, two bearing members 62, a bearing cap 64 at the lower end, a retaining ring 66 at the upper end and a shaft retaining pin 68.

Figure 5:
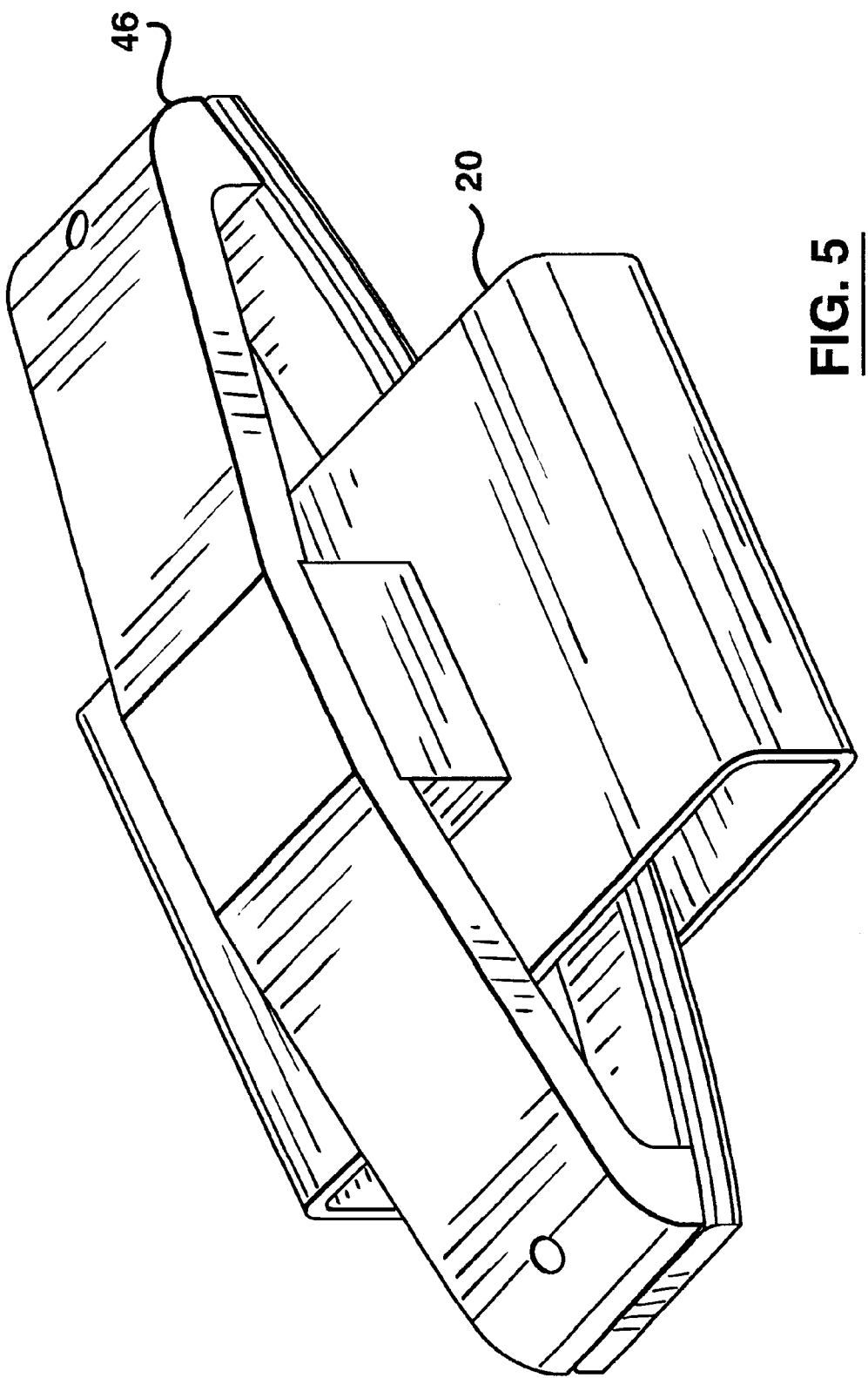
FIG. 5 is a perspective view of one of the magnetic torque motors used in the platform system.

FIG. 5 shown one of the magnetic torque motors in more detail, namely the electrically energizable coil portion 20 which is carried by the base assembly 12 and the magnetic structure portion 46 which is carried by the stabilizing assembly 14. Again, reference is made to U.S. Pat. No. 5,897,223 for a more detailed description.

Figure 6:
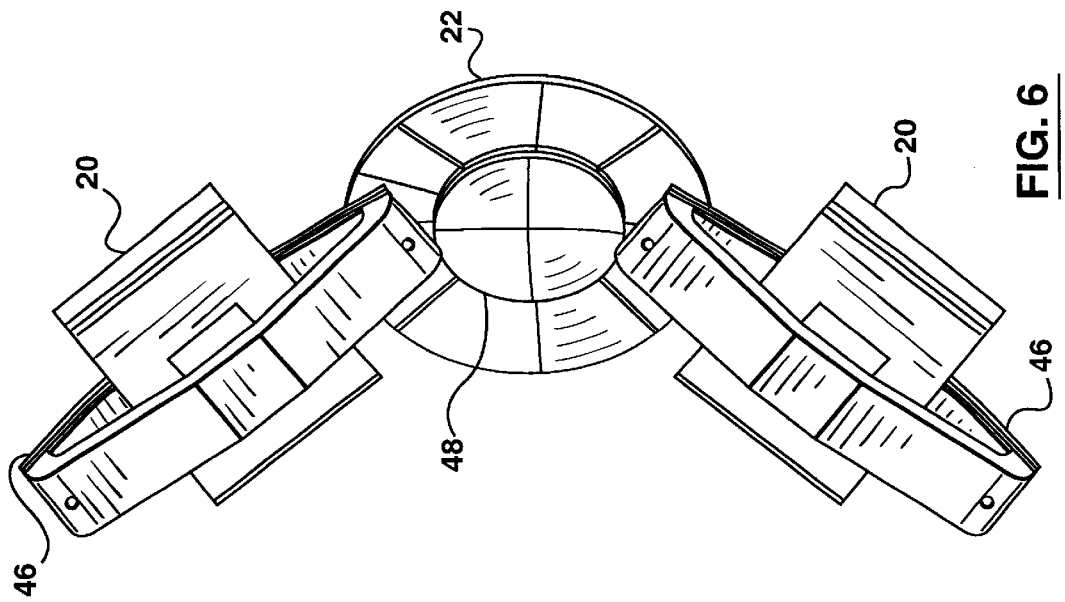
FIG. 6 is a planned view of the torque motors and capacitive sensor array used in the platform system.
Figure 6:
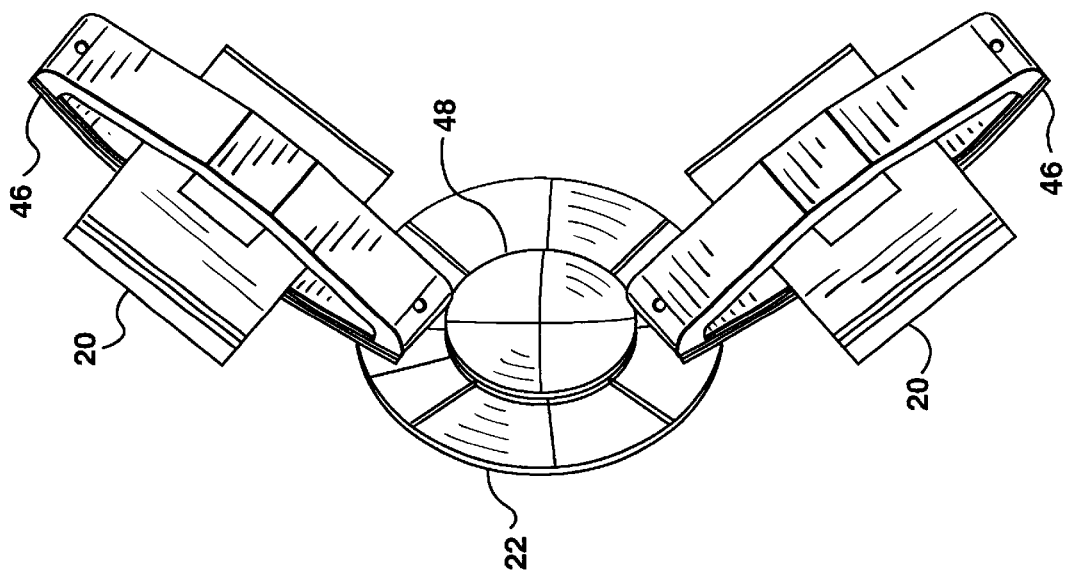

FIG. 6 is a plan view of the four magnetic torque motors 20, 46 and the two capacitive angle sensors 22, 48 and their relation to the point of convergence D of the pivot axes A, B, and C shown in FIGS. 1 and 3.

Figure 7:
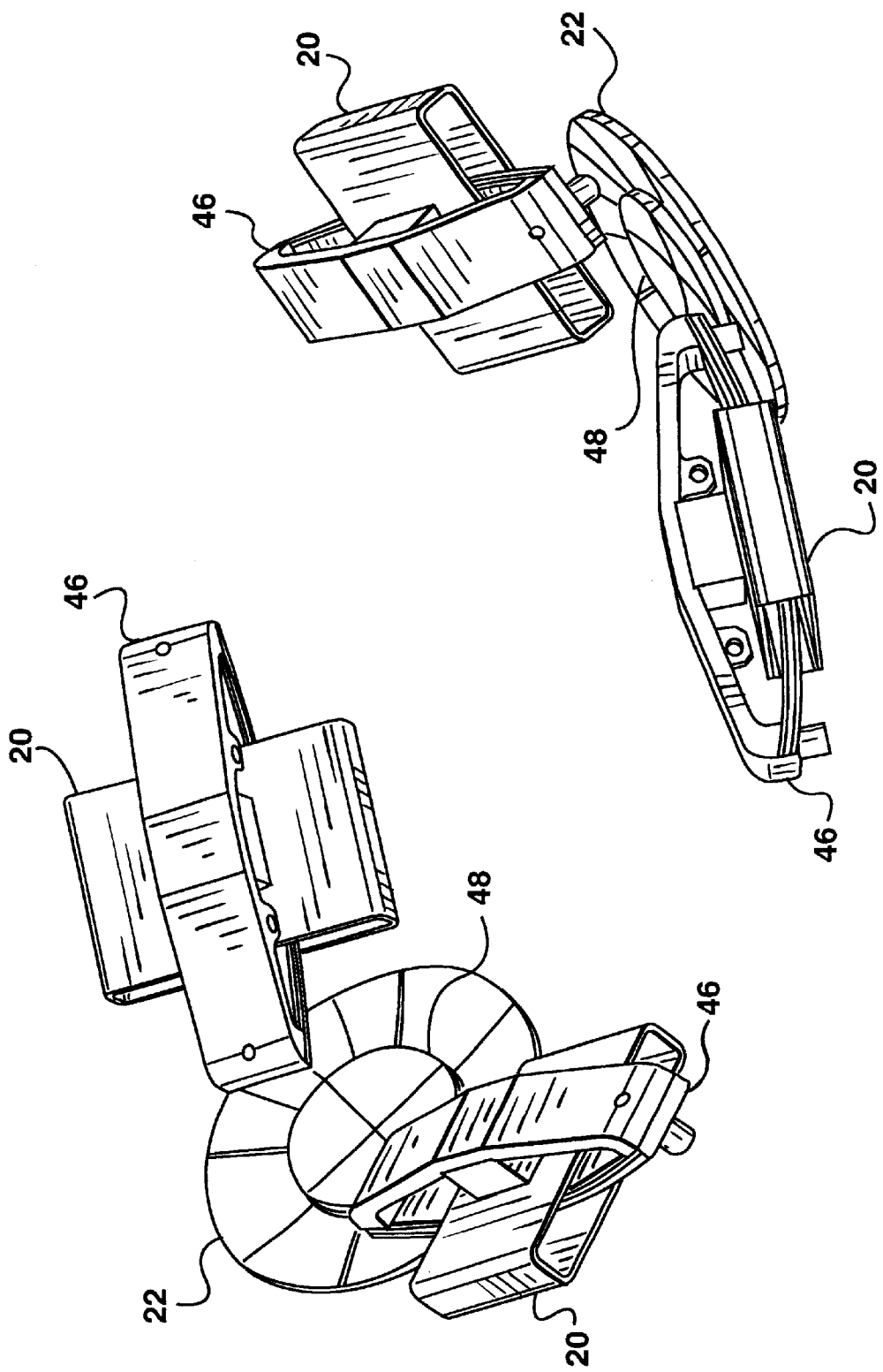
FIG. 7 is a perspective view of the torque motors and capacitive angle sensor array shown in FIG. 6

FIG. 7 is a perspective view of the same components from the same perspective as FIGS. 1 to 3.

Figure 8:
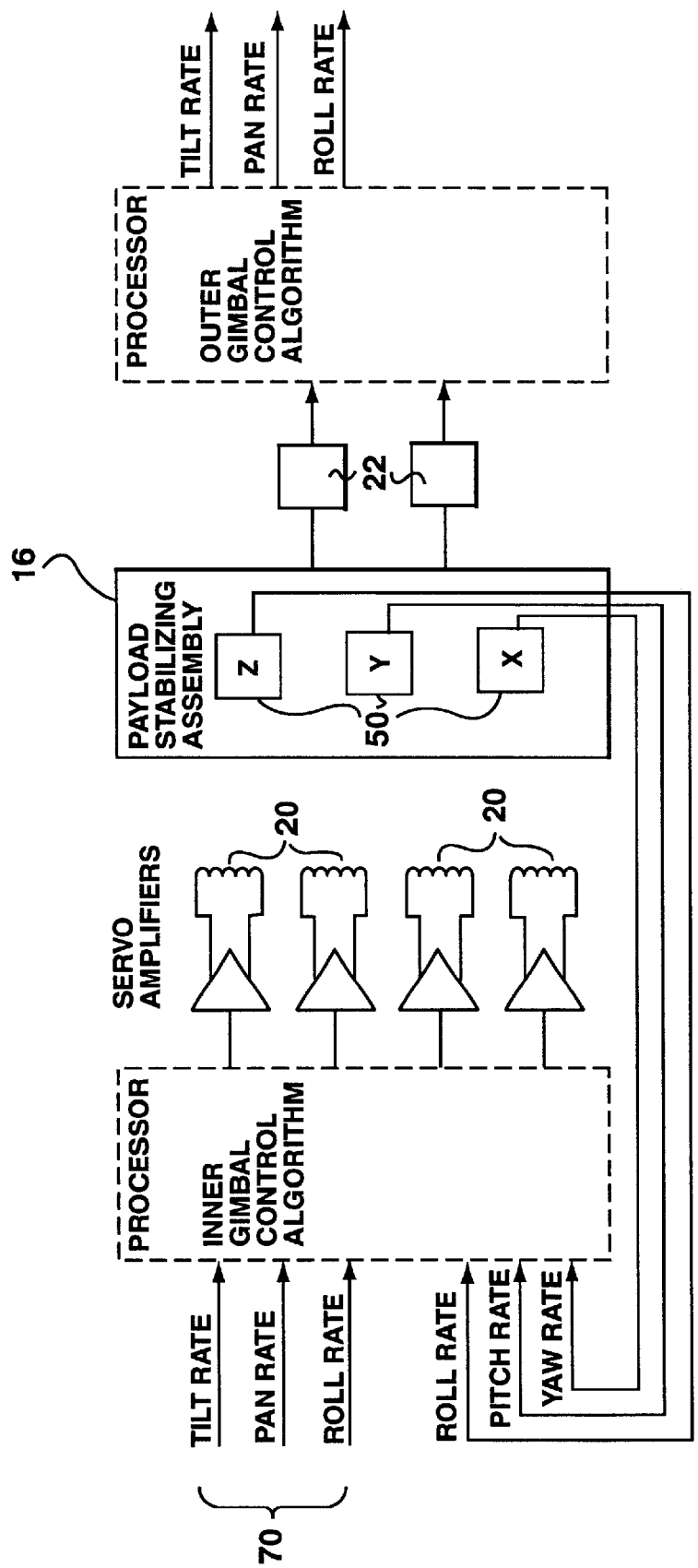
FIG. 8 is a block diagram of the control system for the platform system.

FIG. 8 is a block diagram of the control system of the previously described embodiment of the invention. The control system is based on a single microprocessor and is generally similar to the control systems described in U.S. Pat. No. 5,897,223.

The primary control algorithms of this microprocessor are shown as separate blocks in the figure. The angular rate sensor (or FOG) array 50 attached to the payload carrier 40 detects rates of rotation thereof relative to inertial coordinates. In the absence of external steering commands 70 (i.e. zero demanded rates) the processor's inner gimbal control algorithm computes and causes the torque motor array 20 to apply small correction moments to the inner gimbal using the principal of negative feedback to maintain the angular orientation of the payload stabilizing assembly in space. Capacitive angle sensors 22 sense the angular displacement between the base assembly 12 and the payload stabilizing assembly 14 about three orthogonal axes.

The processor's outer gimbal control algorithm resolves the three angular displacements into components aligned with the axes of the outer follow-up devices servo axes. These displacements are then used to produce steering commands to drive a follow-up steering device to null each of the three angular displacements of the capacitive sensors 22, i.e. to continually centre these sensors, in effect causing the follow-up steering device to follow the orientation of the payload stabilizing assembly 14. Position feedback from the follow-up steering device may be used as part of the outer gimbal control algorithm when such information is available.

In the presence of external steering signals 70, these signals are resolved into three angular velocity vector components aligned with the angular rate sensing (or FOG) axes X, Y and Z, using the angles indicated by the capacitive angle sensor array and the position feedback from the follow-up steering device (if available) to determine the current orientation of the payload stabilizing assembly 14. Three negative feedback control loops then drive the payload stabilizing assembly 14 to follow the external rate steering signals. The outer gimbal control algorithm causes the follow-up steering device to follow the moving payload stabilizing assembly 14 as before.

While the orientation of the payload stabilizing assembly 14 is maintained stationary in space, the earth rotates at the rate of 15 degrees per hour, causing the image of the horizon in the camera to apparently rotate at some component of this rate. Pitch and roll inclinometers mounted on the payload stabilizing assembly 14 may be used to generate automatic rate steering signals to steer the payload stabilizing assembly 14 to maintain a level horizon in the camera image.

An alternative steering mode (follow mode) may us the three angular displacements measured by the capacitive sensors 22 to generate the three steering commands 70 to steer the payload stabilizing assembly 14 to null each of these displacements of the capacitive sensors 22, i.e. to continually centre these sensors, in effect causing the payload stabilizing assembly 14 to follow the orientation of the supporting structure. In such a mode, the stabilized platform functions as a low pass filter between the payload and the supporting structure. Such a steering mode may be used with a tripod and a manually steered head.

It will be appreciated that one adjustment arm may be omitted so that there are only two rotational axes. Alternatively, a further adjustment arm may be provided so that there are four rotational axes.

Other embodiments of the invention will be readily apparent to a person skilled in the art, the scope of the invention being defined in the appended claims.

What is claimed is:

1. A stabilized platform system for isolating a payload from angular motions of a supporting structure, said platform system having:

a base assembly securable to a supporting structure, and a payload stabilizing assembly carried by the base assembly and mounted for angular movement relative thereto about two or more separate axes each of which other than a first axis rotates about a preceding axis, at least one of the axes being non-orthogonal with respect to another of the axes and being mounted for limited angular movement relative to the base assembly, said axes having extensions which meet at a common point.

2. A stabilized platform system according to claim 1 wherein said common point is within the periphery of the payload.

3. A stabilized platform system according to claim 1 wherein the payload stabilizing assembly includes:

a first angular adjustment arm with one end pivotally mounted on the base assembly for limited angular movement relative thereto about a first of said three axes, a second angular adjustment arm having one end pivotally mounted on another end of the first angular adjustment arm for limited angular movement relative thereto about a second of said three axes, and a payload carrier pivotally mounted on another arm of the second angular adjustment arm for limited angular movement relative thereto about the third of said three axes.

4. A stabilized platform system according to claim 1 including an array of at least three magnetic torque motors, each motor having an electrically energizable coil portion carried by the base assembly and a magnetic structure portion carried by the payload stabilizing assembly, each magnetic torque motor having an active axis along which a payload stabilizing assembly positioning force can be applied but having freedom of movement about the other two axes, and a controller for controlling energization of the motors to apply controlled moments to the payload stabilizing assembly about any axis of rotation.

5. A stabilized platform system according to claim 1 having at least one capacitive angle sensor having a first portion carried by the base assembly and the second portion carried by the payload stabilizing assembly with an air gap between said first and second portions, said capacitive angle sensor being responsive to relative movement between the first and second portions to provide a signal indicative of the angular position of the payload stabilizing assembly relative to the base assembly.

6. A stabilized platform system according to claim 1 wherein the payload stabilizing assembly carries at least one angular rate sensor operable to provide the signal of angular movement of the payload stabilizing assembly about a pre-determined axis.

7. A stabilized platform system according to claim 6 wherein the angular rate sensor is a fibre optic gyro.

* * * * *